(No Model.)
T. J. KELLEY.
PLOW.
No. 526,235. Patented Sept. 18, 1894.
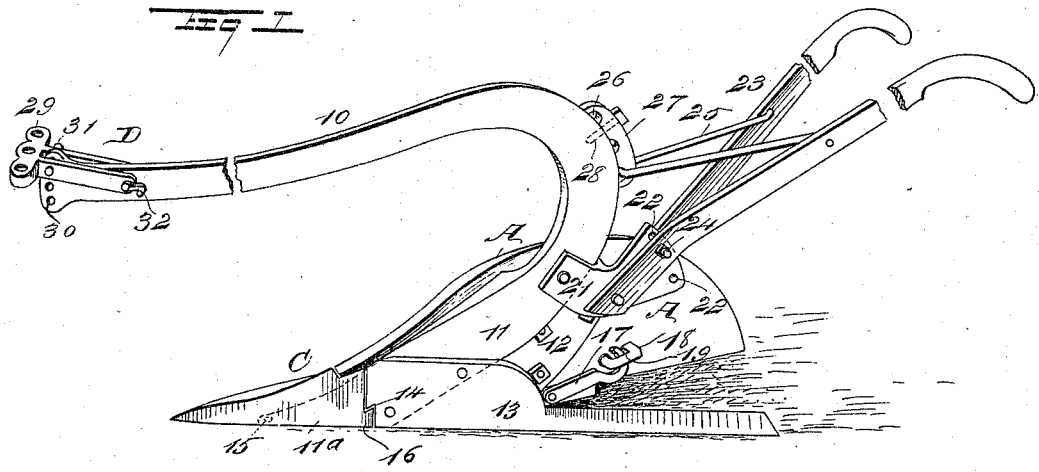
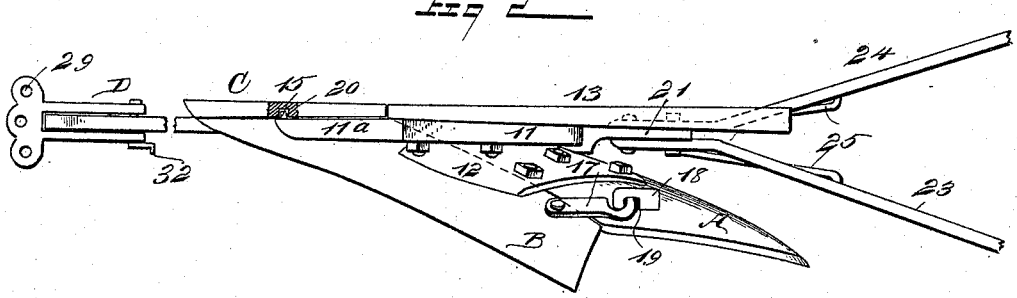
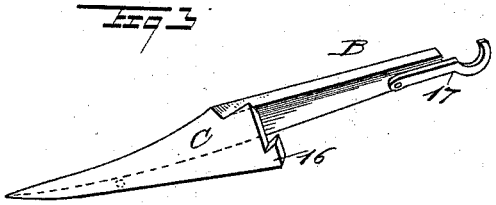
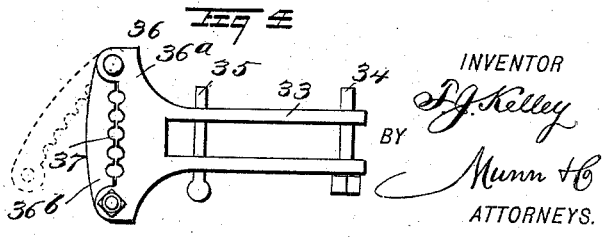
WITNESSES:
H. Walker
Fred Acker
INVENTOR
T. J. Kelley
BY
Munn & Co
ATTORNEYS.
THE NORRIS PETERS CO., PHOTO-LITHO., WASHINGTON, D. C.

UNITED STATES PATENT OFFICE.

THOMAS JEFFERSON KELLEY, OF TOLOSA, ASSIGNOR OF ONE-HALF TO VIRGIL LEE GRABLE, OF PRAIRIEVILLE, TEXAS.

PLOW.

SPECIFICATION forming part of Letters Patent No. 526,235, dated September 18, 1894.

Application filed April 25, 1894. Serial No. 508,948. (No model.)

*To all whom it may concern:*

Be it known that I, THOMAS JEFFERSON KELLEY, of Tolosa, in the county of Kaufman and State of Texas, have invented a new and useful Improvement in Plows, of which the following is a full, clear, and exact description.

My invention relates to an improvement in plows, and it has for its object to provide a plow in which the share is removable therefrom in a convenient and expeditious manner, and is connected with the shank of the beam and with the wing or other support, by a locking connection not involving the use of bolts.

A further object of the invention is to so construct the handle of the plow that it may be adjusted to suit the plowman, and further to so construct the plow that all braces, and other similar barriers usually located at the back of the wing, or share, or landside, will be dispensed with, thus enabling the plow to run free.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the plow viewed from its landside. Fig. 2 is a bottom plan view of the plow partly in section. Fig. 3 is a perspective view of the share and point combined, removed from the plow; and Fig. 4 is a plan view of an improved form of clevis adapted for use with the plow.

In carrying out the invention the plow beam 10 is curved at the rear and carried downward to form a shank 11, to which the share, landside, point and wing are to be attached; and upon the right-hand side of the shank of the plow beam, a predetermined distance above the foot 11ª of the said shank which is flat, a plate 12, is attached to the said shank of the beam, or is made integral therewith, and the said plate is given a curve upon its outer face corresponding essentially to that of the wing to be employed, and that portion of the plow share which adjoins the wing.

Upon the left-hand side of the shank 11 of the plow beam, a landside 13, is bolted or otherwise secured, the bottom of the landside being flat, and it forms virtually a rearward continuation of the foot of the plow, as illustrated in Figs. 1 and 2. At the forward end of the fixed landside, in the bottom portion thereof, a dove-tail or miter recess 14, is produced, as clearly shown in Fig. 1, and the wing A which is employed, is bolted or otherwise attached to the attaching plate 12, and the under surface of said wing is practically straight and smooth.

The attaching plate 12, as illustrated in Fig. 2, extends downward below the lower edge of the wing, and the said lower edge of the wing while straight longitudinally is vertically beveled to a greater or less degree. Upon the left-hand side of the foot portion of the shank 11 of the beam a lug or pin 15 is formed, which extends preferably at a right angle from the said foot at its extreme forward end.

The share B combines with it a point C, the two being virtually integral, and the upper face of the share is beveled to correspond to the lower edge of the wing, as these two edges are adapted to be brought into contact and meet with a close joint.

At the rear end of the point of the share, that is to say, the rear end of its landside section, it is provided with a dove-tail or miter lug 16, and the upper rear edge of the point extends slightly above the upper forward edge of the share, as illustrated in Fig. 3. A hook 17, is pivoted upon the inner face of the share a predetermined distance from its rear end, and a staple 18, is pivoted upon the inner face of the wing, the said staple being provided with a cam shaped or eccentric receiving section 19 for the hook. In other words, the side walls of the opening in the staple through which the hook is to pass are beveled so as to have eccentric bearing upon the hook when the staple is carried to locking position.

A combined share and point constructed as above described is expeditiously and conveniently attached to a plow when desired by simply causing the pin 15 of the foot of the shank to enter an aperture 20 in the inner face of the point, as shown in Fig. 2, and bringing the upper edge of the share in engagement with the lower edge of the wing, at which time the point C at its rear will be brought into a miter engagement with the forward portion of the landside 13 by the lug 16 of the point entering the recess 14 in the landside, as fully shown in Fig. 1. The hook is then carried upward upon the back or inner face of the wing, and the staple is carried downward over the hook until one of its walls shall have binding and eccentric contact with the hook, as shown in the drawings. In this manner it will be observed that the share and point of a plow may be readily removed and stored away when the implement is not in use; or a point and share having a different sweep, or constructed on different lines may be used on a plow when desired. It will be understood that a wing of different sweep from that shown may likewise be secured to the attaching plate 12 when necessary. A bracket 21 is secured to the shank 11 a predetermined distance from the ground, which bracket is of angular construction, one of its members extending upwardly and rearwardly. The upper end of this member is preferably widened out and is provided with a series of apertures 22, arranged transversely therein. The plow handles 23, are pivotally connected to the lower portion of the upwardly-extending member of the bracket, or at the junction of the two members, and the handles are adjusted to suit a tall or a short man by passing a bolt 24 through both of the handles and through an upper or a lower aperture 22 in the bracket, or through the central one. The handles are likewise provided with a brace 25 of somewhat U- or V-shape, and the bow portion of the brace is carried in direction of the beam and is adapted to practically engage therewith as shown in Fig. 1; and as the handles are adjustable upon the bracket the brace is correspondingly adjustable upon the beam by passing the brace into one of a series of recesses 26, formed in an adjusting block 27, which is connected with the rear of the beam by a bolt 28, or its equivalent.

A plow constructed as above set forth is exceedingly simple, durable and economic in its construction, and is adapted for many purposes. The clevis D is likewise of peculiar construction, consisting of a bifurcated shank which is pivotally connected with the plow beam, and a head containing a number of apertures 29, which head is horizontally located and is adapted to move over the forward end of the beam, which end is cylindrical and enlarged transversely, and is provided with a vertical series of apertures 30. The adjustment of the clevis is accomplished by passing a pin 31 through the shank of the clevis, and in one of the apertures 30 in the beam, the clevis being raised or lowered through the medium of a crank arm or handle 32 attached to it at its pivot point. In this manner the team may be brought in desired position, and a single tree or double tree may be attached directly to the clevis.

In Fig. 4, I have shown a form of clevis capable of being advantageously employed in connection with a plow beam. This clevis consists of a forked body 33, adapted to span a plow beam, and provided with a pivot pin 34, and an adjusting pin 35 intended to be passed through any of the apertures 30 in the plow beam. The body is made integral with a head 36, constructed in two sections 36ª and 36ᵇ. These sections are pivotally connected at one end, and are adapted for locking engagement at their opposite ends. The inner edge of the outer section and the outer edge of the inner section are provided with recesses 37, and corresponding recesses are brought into register when the two sections are locked together. It is evident that this form of clevis dispenses with the use of lap links and twist links, since by opening the front section of the clevis and passing said member through the opening in the clip of a single or double tree and then securing the two sections, the attachment of the team is not only quickly and adjustably made, but the team is also brought closer to its work and the draft is rendered exceedingly light.

Having thus described my invention, I claim as new and desire to secure by Letters Patent—

1. The combination with the plow beam, having a bracket 21 secured to its downwardly curved rear end and provided with a series of apertures, and a block 27 recessed on its inner edge and bolted to the rear edge of the beam above said bracket, of the handles pivoted to the bracket and having apertures through which and the bracket apertures, a pin or bolt 24 is passed, and a U-shape brace pivoted at its ends to the handles and at its bend extending through one of the recesses in the block, substantially as described.

2. The clevis comprising the forked body 33 adapted to span a plow beam and having a pivot bolt aperture and an aperture in front thereof for the adjusting pin or bolt, and a horizontal head 36 constructed in two sections 36ª 36ᵇ recessed in their adjacent edges to form a series of apertures, pivoted together at one end and detachably connected at their opposite ends by a removable bolt or pin, substantially as described.

THOMAS JEFFERSON KELLEY.

Witnesses:
MISSOURI M. TODD,
BRYANT TODD.